F. A. READ.
SHAFT BRAKE OR FRICTION DEVICE.
APPLICATION FILED DEC. 1, 1911.
1,081,988.
Patented Dec. 23, 1913.
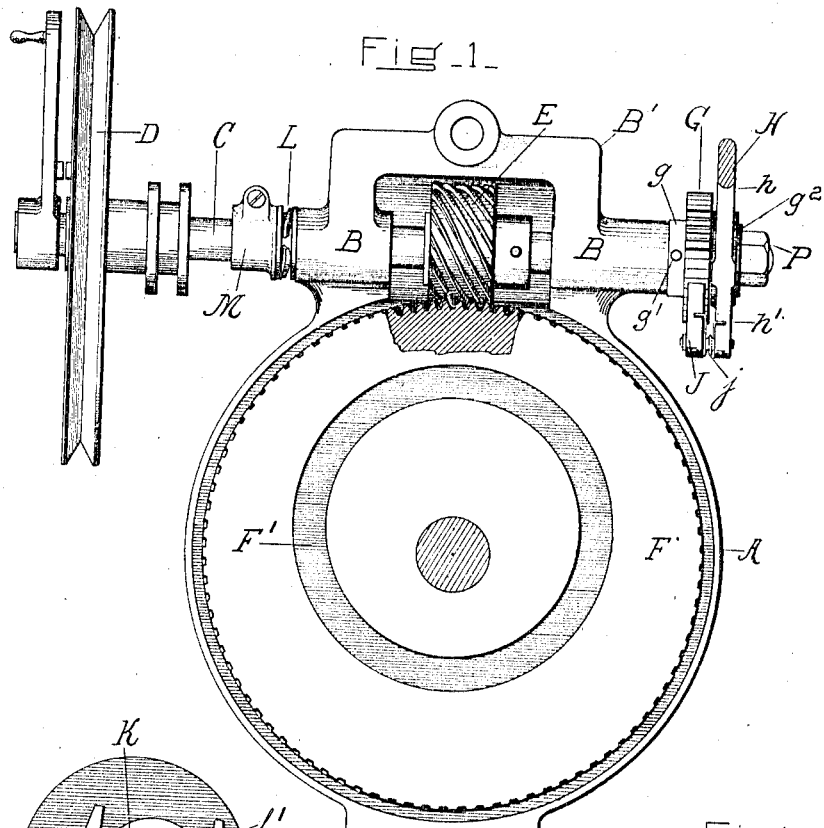
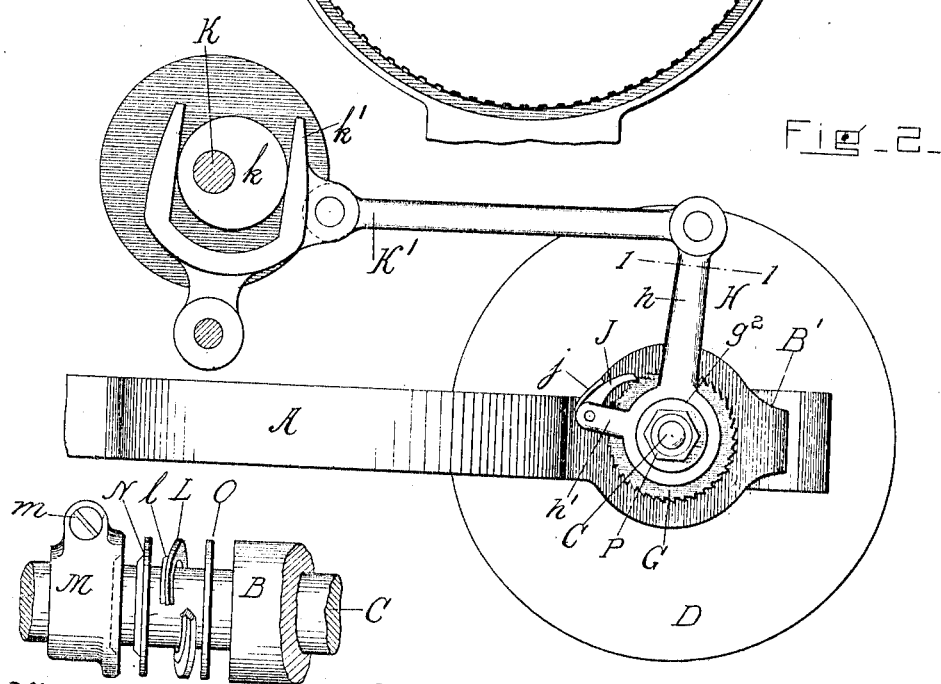
Witnesses:
E. B. King
L. C. Morrison
Inventor
Fred A. Read,
By his Attorneys,
Rogers, Kennedy & Camp

UNITED STATES PATENT OFFICE.

FRED A. READ, OF LYNN, MASSACHUSETTS, ASSIGNOR TO THE REECE BUTTON HOLE MACHINE COMPANY, OF BOSTON, MASSACHUSETTS, A CORPORATION OF MAINE.

SHAFT-BRAKE OR FRICTION DEVICE.

1,081,988.  Specification of Letters Patent.  Patented Dec. 23, 1913.

Application filed December 1, 1911. Serial No. 663,450.

*To all whom it may concern:*

Be it known that I, FRED A. READ, a citizen of the United States, residing at Lynn, in the county of Essex and State of Massachusetts, have invented certain new and useful Improvements in Shaft-Brakes or Friction Devices, of which the following is a specification, reference being had therein to the accompanying drawing.

My invention relates to a shaft brake or a device for imposing friction upon a machine shaft for various purposes, such for example as to prevent undue and improper shaft movements. While the present device might be employed in many varied situations, I will herein describe it as applied to a shaft driven by a pawl and ratchet, the shaft carrying, for example, a worm for in turn driving a worm wheel.

The present invention, while it might be employed on any kind of machine, is shown as applied in connection with mechanical parts constituting members of the Reece buttonhole sewing machine.

Understanding that the embodiment about to be described, represents only one use of the present invention, I will now refer to the figures of the drawings constituting a part of this application.

Figure 1 is a view showing the shaft C lengthwise, of sufficient of the parts of a machine to indicate the construction, arrangement and function of the present invention. Fig. 1 may also be said to be a top view of the parts shown in Fig. 2 with the arm H, however, broken off in the plane 1—1, and the parts K, K', k, k' omitted. Fig. 2 is an elevation looking from the right-hand side toward the parts shown in Fig. 1; and to accommodate Fig. 2 on the sheet it has been turned at right angles instead of presenting it upright. Fig. 3 is an enlarged detail view similar to the view in Fig. 1, of certain parts of the present invention.

Similar letters of reference designate corresponding parts in the several figures of the drawings.

The casing A and shaft bearings B, B, as also the yoke B' connecting the latter, are relatively stationary parts of a machine of any desired type; although all the parts seen in Fig. 1 may in fact shift or oscillate in the operation of the machine, for example, in accordance with the shifting of the needle in traveling around a buttonhole.

Engaging the bearings B, B is the shaft C, to which my present invention is shown applied.

At the left end of shaft C is a member D which may constitute a pulley, and also a part of a clutch for certain purposes, but which forms no part of the present invention and will not be further described.

The shaft C to which my invention is herein applied may be for the purpose of operating a worm and wheel, there being shown a worm E on the shaft driving a worm wheel F within the casing A. The purpose of the worm wheel F may be, for example, to drive a slow moving cam F'.

It being desired to give a step-by-step motion to the parts described, the shaft C is shown as actuated through a pawl and ratchet device. Thus a ratchet wheel G is shown which rotates with the shaft C, said wheel having a hub $g$ by which it is secured to shaft C through a pin $g'$ passing through hub and shaft. A pawl support H may comprise a long arm $h$ and a short arm $h'$ rigidly connected to each other and free to rotate with respect to shaft C and ratchet G. Carried on the short arm $h'$ is the pawl J, having spring $j$ adapted to maintain the pawl in constant engagement with the teeth of the ratchet wheel G.

To actuate the pawl to drive the ratchet and thereby the shaft C with a step-by-step movement, vibrating means may be employed for oscillating the arm $h$ of the pawl support H. Thus upon any shaft K of the machine may be mounted an eccentric $k$ which engages an eccentric piece $k'$, which latter is connected by link K' to said arm $h$. Rotation of shaft K thereby effects oscillation of arm $h$ and consequently the to-and-fro movement of the pawl over the teeth of the ratchet wheel.

With a well constructed and well oiled machine, it is obvious that there will be a distinct tendency on the backward or non-feeding movement of the pawl to carry the shaft C backwardly and thereby off-set the feed of the parts by restoring them to or toward their previous position. This objection has been found to be so serious that expedients have been devised to correct it, it having been known, for example, to apply a friction brake consisting of a specially provided peripheral band engaging upon the periphery of a wheel. The wheel F for example may be surrounded by a friction band, one end of which is fastened to casing A, the band extending part way around wheel F, and having at the other end complicated means for tightening and loosening it to secure adjustment of the tension and thereby the friction.

Without any brake or friction device, the pawl action and the timing of the machine are interfered with. With the brake band device already known, the results have not been satisfactory and the device occupies space, is troublesome to keep in adjustment, wears rapidly, and is costly to renew.

With my improvement about to be referred to, all of the objections above noted are overcome and a small, compact, simple, inexpensive, durable device is afforded which I have found to very efficiently serve the purpose at hand.

My improved device L may be described as a shaft device, since it surrounds a shaft, for example the shaft C, and it is in the form of a ring in the sense of surrounding or substantially surrounding the shaft. The device L is so constructed and arranged as to impose a friction on the movement of the shaft C, thereby preventing its accidental backward revolution when not desired. The ring device L to this end consists not of a flat ring but one deflected out of flatness, preferably by splitting it and off-setting one part with respect to another. Thus referring more particularly to Fig. 3, the device L is seen to consist of a split ring having its free ends bent longitudinally from each other so that in effect the ring's form is similar to one convolution of a helix.

In order to confine the device L in place, so as to impose the required friction, I have provided a collar M which may be secured to the shaft C in such manner as to secure the device L between the collar and the bearing B, whereby the endwise pressure of the device and friction resulting therefrom will tend to prevent the shaft's undue movement.

Referring to the further preferred details of the device L, it will be seen that it is provided with an annular rib $l$, this serving to increase the strength, the durability and the friction of the device. Also the device L is shown as located upon the shaft C between two washer members N and O, and the washer N is shown as having a dished form for accommodating the rib $l$ of the device L. The collar M may also be dished for a similar purpose.

The collar M may have a clamping device $m$ whereby the collar may be tightened upon the shaft in any desired adjustment, and if the hub $g$ shall be fixed upon the shaft C as shown, then the collar M would be employed for adjusting the compression and thereby the friction imposed by the device L. A nut P engaging a screw thread on the end of shaft C and bearing against a collar on said shaft, serves to hold the parts in place.

In Figs. 1 and 2 a washer $g^2$ is shown inserted for convenience between the nut P and the hub of ratchet wheel G, although said washer might be formed integral with the nut in either case.

The adjustment of the parts in Fig. 1 may be considered as not sufficiently tight for imposing any great friction, the parts having been shown in this adjustment for clearness. In practical use the parts may be so designed and arranged that the ring device L will be compressed substantially into flat condition when in proper adjustment.

It will be seen that by reason of the construction above shown and described a shaft brake or friction device is provided which answers the objects and affords the advantages of the invention as hereinbefore set forth; and other advantages will be apparent to those skilled in the art.

Having thus described my invention, what I claim and desire to secure by Letters Patent, is:

1. The combination of a shaft, a shaft-friction device including a ring-shaped member of resilient material encompassing said shaft and formed with but a pair of side surfaces and split at one point to present two ends which are initially deformed to lie out of alinement and which by pressure are adapted to be brought toward approximate alinement, and pressure-exerting means, tending to aline said ends and cause friction on the shaft of a degree corresponding to the relative position of said initially unalined ends.

2. The combination of a shaft, a shaft-friction device including a ring-shaped member of resilient material encompassing said shaft and formed with but a pair of side surfaces and split at one point to present two ends which are initially deformed to lie out of alinement and which by pressure are adapted to be brought toward approximate alinement, said member having formed on one of its said side-surfaces an annular strengthening and resiliency-increasing rib, and pressure-exerting means tending to aline said ends and cause friction on the shaft of a degree corresponding to the relative position of said initially unalined ends.

3. The combination of a shaft, a shaft-friction device including a ring-shaped member of resilient material encompassing said shaft and formed with but a pair of side-surfaces and split at one point to present two ends which are initially deformed to lie out of alinement and which by pressure are adapted to be brought toward approximate alinement, said member having formed on one of its said side-surfaces an annular strengthening and resiliency-increasing rib, a dished washer adapted to engage and house a portion of said ribbed member, and pressure-exerting means tending to aline said ends and cause friction on the shaft of a degree corresponding to the relative position of said initially unalined ends.

4. In combination, a shaft provided with an annular shoulder, a washer juxtaposed thereto, means for intermittently rotating said shaft, and a friction-imposing device encompassing said shaft and including a dished washer loose on said shaft, a resilient ring-shaped member formed with two side-surfaces only and split at one point to present two ends normally deformed out of alinement and provided on one of said side-surfaces with an annular rib adapted to fit into said dished washer, the opposite side-surface of said member engaging said first-mentioned washer and the latter engaging the shoulder on the shaft, and means acting to change the relation between said shoulder and washers and thereby compress the unalined portions of said ring-shaped member whereby said unalined ends tend to aline and cause the member to impose friction upon said shaft.

5. In combination, a shaft provided with an annular shoulder, a washer juxtaposed thereto, means for intermittently rotating said shaft, and a friction-imposing device encompassing said shaft and including a dished washer loose on said shaft, a resilient ring-shaped member formed with two side-surfaces only and split at one point to present two ends normally deformed out of alinement and provided on one of said side-surfaces with an annular rib adapted to fit into said dished washer, the opposite side-surface of said member engaging said first-mentioned washer and the latter engaging the shoulder on the shaft, and adjustable means acting to change the relation between said shoulder and washers and thereby compress the unalined portions of said ring-shaped member whereby said unalined ends tend to aline and cause the member to impose friction upon said shaft.

In testimony whereof I affix my signature in presence of two witnesses.

FRED A. READ.

Witnesses:
DONALD CAMPBELL,
GEO. E. GILL.